United States Patent Office 2,806,022
Patented Sept. 10, 1957

2,806,022

PREPARATION OF METAL SALTS OF PHOSPHORUS SULFIDE-HYDROCARBON REACTION PRODUCTS

Albert R. Sabol, Munster, Ind., assignor to Standard Oil Company, Chicago, Ill., a corporation of Indiana No Drawing. Application September 29, 1955, Serial No. 537,579

9 Claims. (Cl. 260—139)

The present invention relates to improvements in the preparation of neutralized reaction products of a phosphorus sulfide and a hydrocarbon, and more particularly is directed to improvements in neutralizing the reaction products of a phosphorus sulfide and a hydrocarbon with a basic metal compound.

Neutralized reaction products of a phosphorus sulfide and a hydrocarbon, particularly olefin polymers, are extensively used as lubricant additives in the preparation of improved lubricants for internal combustion engines. The use of such materials in lubricant compositions is described in U. S. Patents Nos. 2,316,080 and 2,316,082, issued April 6, 1943, to Clarence M. Loane and James W. Gaynor. The specifications of these patents disclose a neutralization of phosphorus sulfide-olefin polymer reaction products and phosphorus sulfide-hydrocarbon reaction products by treatment with various neutralizing agents at about 100° F.–400° F. While, in general, no difficulty is encountered in neutralizing such reaction products in the manner heretofore practiced, it has been observed that when neutralizing such reaction products with an amount of basic metal compound which would result in a basic composition having a metal to phosphorus weight ratio on the order of from 3 to about 10, difficulties are encountered by reason of poor filtration rates which reduce the yields and increase the manufacturing costs. As more and more fuels having high sulfur contents come into use, it becomes necessary to provide lubricants which are basic and serve even more effectively as agents to neutralize acidic compounds and to act as detergents to disperse particles of carbon, resin and the like in the lubricating oil. It is well known that increasing the metal content, and hence the basicity, of an additive of the type described herein will effectively increase the ability of the oil to neutralize acids formed by the combustion of the fuel. It is also known that the most economical way of increasing the metal content of a lubricating oil containing an additive of the type described herein is to increase the metal to phosphorus ratio of the additive rather than to increase the total amount of additive in the oil to obtain the desired metal content level.

It is an object of the present invention to provide an additive for lubricating oil having a high metal to phosphorus ratio. It is a further object to provide a method of more efficiently neutralizing reaction products of a phosphorus sulfide and a hydrocarbon with a basic metal compound. Still another object of the invention is to provide a method of increasing the utilization of a basic metal compound in the neutralization of reaction products of a phosphorus sulfide and a hydrocarbon. A more specific object is to provide a method of neutralizing the reaction product of a phosphorus sulfide and a hydrocarbon with a basic metal compound whereby a substantially clear product, readily filterable and having a high metal to phosphorus ratio is obtained. Other objects and advantages of the present invention will become apparent from the following description thereof.

In accordance with the present invention, the foregoing objects can be attained by carrying out the neutralization of the reaction products of a phosphorus sulfide and a hydrocarbon, particularly olefin polymers, with a basic metal compound in the range of from about 3 to about 15 parts by weight of metal per part of phosphorus present in the phosphorus sulfide-hydrocarbon reaction product, in the presence of from about 0.5 to about 2 mols of water per mol of the metal, preferably about one mol of water per mol of metal, and from about 2 to about 20 mols of methyl, ethyl or propyl alcohol per mol of the metal used in the neutralization. The neutralization is preferably carried out at a temperature at or below the reflux temperature of the mixture by admixing the phosphorus sulfide-hydrocarbon reaction product diluted in a normally liquid hydration with a slurry of a basic metal compound in a normally liquid hydrocarbon to which has preferably been added the requisite amount of alcohol and water. The phosphorus sulfide-hydrocarbon reaction product may be contacted with an adsorbent clay or otherwise treated before the neutralization step to remove inorganic phosphorus compounds and low molecular weight organic phosphorus compounds.

In the preparation of the phosphorus sulfide-hydrocarbon reaction product, the hydrocarbon is reacted with a phosphorus sulfide, such as $P_2S_3$, $P_4S_3$, $P_3S_7$, or other phosphorus sulfides, and preferably phosphorus pentasulfide, $P_2S_5$.

The hydrocarbon constituent of this reaction is described in detail in U. S. 2,316,080, 2,316,082, and 2,316,088, each issued to Loane et al. on April 6, 1943. Briefly, the hydrocarbon constituent is preferably a mono-olefin hydrocarbon polymer resulting from the polymerization of low molecular weight mono-olefinic hydrocarbons or isomono-olefinic hydrocarbons, such as propylenes, butylenes and amylenes, or the copolymers obtained by the polymerization of hydrocarbon mixtures containing iso-mono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride or other similar halide catalysts of the Friedel-Crafts type.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons the polymer is fractionated to obtain a fraction of the desired viscosity, such as for example, from about 80 seconds to about 2000 seconds Saybolt Universal at 210° F.

Essentially paraffinic hydrocarbons such as bright stock residuums, lubricating oil distillates, petrolatums, or paraffin waxes, may be used. There can also be employed the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride, and the like.

Other preferred olefins suitable for the preparation of the hereindescribed phosphorus sulfide reaction products are olefins having at least 20 carbon atoms in the molecule, of which from about 13 carbon atoms to about 18 carbon atoms, and preferably at least 15 carbon atoms, are in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

Also contemplated within the scope of the present invention are the reaction products of a phosphorus sulfide with an aromatic hydrocarbon, such as for example, benzene, naphthalene, toluene, xylene, diphenyl and the like or with an alkylated aromatic hydrocarbon, such as for example, benzene having an alkyl substitutent having at least four carbon atoms, and preferably at least eight carbon atoms, such as long chain paraffin wax.

In general, the preparation of the phosphorus sulfide-hydrocarbon reaction product in accordance with the present invention is carried out in the following manner:

The hydrocarbon, such as for example, an olefinic polymer of the desired molecular weight, is reacted with from about 1% to about 50% and preferably from about 5% to about 25%, of a phosphorus sulfide, e. g., $P_2S_5$ at a temperature of from about 200° F. to about 600° F. in a non-oxidizing atmosphere, such as for example, an atmosphere of nitrogen. The reaction is carried out for from about one to about ten hours or more, and preferably for about five hours. The phosphorous sulfide-hydrocarbon reaction can, if desired, be carried out in the presence of a sulfurizing agent as described in U. S. 2,316,087, issued to J. W. Gaynor and C. M. Loane April 6, 1943. The reaction product obtained is then hydrolyzed at a temperature of from about 200° F. to about 500° F., and preferably at a temperature of 300° F. to 400° F., by a suitable means, such as for example, by introducing steam through the reaction mass. The hydrolyzed product containing inorganic phosphorus acids formed during the hydrolysis may then be contacted with an adsorbent material such as Attapulgus clay, fuller's earth and the like at a temperature of from about 100° F. to about 500° F. as more fully described and claimed in U. S. 2,688,612 issued September 7, 1954, to Roger W. Watson, and the treated hydrolyzed product filtered to obtain a filtrate substantially free of inorganic phosphorus acids and low molecular weight organic phosphorus compounds. Although such a clay treating step has been found to be preferable when the prior art methods of neutralizing the phosphorus sulfide-hydrocarbon reaction product are employed, I have found that it is not necessary when using the neutralization process of this invention. Yields of from about 10 to 20% higher are obtained when using my process as compared to the prior art methods wherein the clay treating step is employed.

The hydrolyzed reaction product of phosphorus sulfide and hydrocarbon, preferably treated in the above manner, with or without clay treating, is then diluted with a normally liquid hydrocarbon, generally the same as, or similar to the hydrocarbon in wthich the finished additive is to be employed, to a phosphorus content of from about 0.5% to about 5% or more. The neutralization step is carried out with a suitable basic metal compound such as a hydroxide, carbonate, oxide or sulfide of an alkaline earth metal or an alkali metal such as, for example, potassium hydroxide, sodium hydroxide, barium oxide, barium hydroxide, barium sulfide or the like. Other basic metal compounds may also be used such as, for example, lead oxide, mercuric oxide, or the like. It is preferable, however, to use an alkaline earth metal compound such as barium oxide.

The basic metal compound may be admixed directly with the phosphorus sulfide-hydrocarbon reaction product; it is preferable, however, to form a slurry of the basic metal compound in a normally liquid hydrocarbon of a type comparable to the lubricating oil in which the additive is to be used. The total amount of the basic metal compound present in the slurry should be from about 3 to about 15 parts per part of phosphorus present in the phosphorus sulfide-hydrocarbon reaction product which is to be neutralized therewith.

The alcohol and water are preferably added to the basic metal compound slurry before admixing the slurry and phosphorus sulfide hydrocarbon reaction product although they may be added to the phosphorus sulfide-hydrocarbon reaction product or to the admixture of the basic metal compound slurry and the phosphorus sulfide-hydrocarbon reaction product. It is not essential that the water and alcohol be introduced together or simultaneously. It is preferable, however, to pre-mix the water and alcohol before adding to the basic metal compound slurry. I have found that the optimum amount of water necessary is about 1 mol per mol of basic metal compound used in the neutralization, although as little as 0.5 mol of water or as much as 2 mols of water per mol of basic metal compound may be used. If an inadequate amount of water is used in the neutralization step, the neutralized product tends to gel and thereby becomes difficult to filter. If a surplus of water is used, I have found that the neutralized product is not always clear and bright and that high ratios of metal to phosphorus are not consistently obtainable.

The alcohol present during the neutralization step may be either methyl, ethyl or propyl alcohol, it is preferable, however, to use methyl alcohol. About 2 to about 20 mols of alcohol per mol of basic metal compound may be used although the preferred range is from about 5 to about 10 mols of alcohol per mol of basic metal compound.

After admixing the ingredients as pointed out hereinbefore, the neutralization reaction is preferably carried out by heating the mixture to a temperature not higher than its reflux temperature for about 1 to about 5 hours. A reflux condenser is employed to condense any alcohol or water vapors which may be vaporized. The higher neutralization temperatures obtained at reflux cause the reaction to proceed at a faster rate and are therefore preferable to very low temperature neutralization. After a period of from about 1 to about 5 hours has elapsed, the temperature is increased to about 400° F. and the water and alcohol vapors are permitted to pass through the reflux condenser. To illustrate my invention, the data shown in Tables I and II were obtained.

Table I illustrates the neutralization of a hydrolyzed, clay treated reaction product of phosphorus penta-sulfide and a butylene polymer of about 1000 molecular weight using methanol as the alcohol. In all of the examples described herein, the phosphorus sulfide-butylene polymer reaction product was diluted such that the percent phosphorus in the diluted mixture was 1.4%, and the amount of barium employed in the reaction, on a weight basis, was in an amount equal to 6.5 times the amount of phosphorus in the diluted phosphorus sulfide-butylene polymer reaction product.

The examples shown in Table II illustrate the neutralization of a hydrolyzed reaction product of phosphorus penta-sulfide and a butylene polymer of about 1000 molecular weight, also using methanol as the alcohol; in these examples the phosphorus sulfide-butylene polymer reaction product was not clay treated.

Runs 4 through 12 in Tables I and II show that using alcohol and water within the ranges hereinbefore described results in a product which is easy to filter, has a high barium to phosphorus ratio and has good clarity. Run 1 shows the effect of omitting both water and alcohol; filter rate and Ba/P ratio were both low. Run 2 shows the effect of omitting water, in which case the neutralized mixture was unfilterable. In run 3 alcohol was omitted and, although the filter rate was satisfactory, the Ba/P ratio was low.

While, as noted above, the phosphorus sulfide-hydrocarbon reaction product may be neutralized, with or without prior contact with clay, it is contemplated within the scope of this invention that other steps, in addition to or in lieu of the clay treating step, may be employed.

The metal containing neutralized reaction products of a phosphorus sulfide and a hydrocarbon obtained in accordance with the present invention are useful as additives and lubricant compositions used for the lubrication of internal combustion engines.

Percentages given herein and in the appended claims are weight percentages unless otherwise noted.

While I have described my invention by reference to specific embodiments thereof, the same are given by way of illustration only and are not intended to define the breadth of the invention but includes within its scope such modifications and variations as come within the spirit of the appended claims.

TABLE I
*Neutralization of hydrolyzed, clay-treated $P_2S_5$-butylene polymer reaction product*

| Run | Mol Ratios | | Reaction Temp., °F. | Product | | |
|---|---|---|---|---|---|---|
| | $H_2O$/BaO | $CH_3OH$/BaO | | Filter Rate, Gal./ft.²/hr. | Ba/P Wt. Ratio | Clarity |
| 1 | 0 | 0 | 160 (Reflux) | 0.5 | 2.0 | |
| 2 | 0 | 5 | 160 (Reflux) | 0 (Gel forms) | -------- | -------- |
| 3 | 1.0 | 0 | 160 (Reflux) | 3.5 | 3.4 | Bright. |
| 4 | 2.0 | 8.7 | 160 (Reflux) | 2.0 | 6.0 | Bright. |
| 5 | 2.0 | 10 | 160 (Reflux) | 3.5 | 5.4 | Slightly hazy. |
| 6 | 2.0 | 7 | 140-150 | 1.2 | 5.8 | Bright. |

TABLE II
*Neutralization of hydrolyzed $P_2S_5$-butylene polymer reaction product, without prior clay treating*

| Run | Mol Ratios | | Reaction Temp., °F. | Product | | |
|---|---|---|---|---|---|---|
| | $H_2O$/BaO | $CH_3OH$/BaO | | Filter Rate, Gal./ft.²/hr. | Ratio | Clarity |
| 7 | 0.6 | 5 | 140-150 | 8.0 | 5.35 | Bright. |
| 8 | 1.0 | 3 | 140-150 | 5.5 | 5.1 | Bright. |
| 9 | 1.0 | 3.5 | 140-150 | 7 | 5.6 | Bright. |
| 10 | 1.0 | 5 | 140-150 | 5.6 | 5.6 | Bright. |
| 11 | 0.5 | 5 | 160 (Reflux) | 3.2 | 6.0 | Bright. |
| 12 | 1.0 | 5 | 160 (Reflux) | 8.0 | 5.7 | Slightly hazy. |

I claim:

1. In the preparation of a metal-containing neutralized reaction product of a phosphorus sulfide and a hydrocarbon consisting essentially of said hydrocarbon, said metal, phosphorus and sulfur, in which the hydrocarbon is reacted with from about 1% to about 50% of a phosphorus sulfide at a temperature of from about 200° F. to about 600° F., and neutralized with a basic metal compound, the improvement comprising neutralizing the phosphorus sulfide-hydrocarbon reaction product with from about 3 to about 15 parts by weight of said basic metal compound per part by weight of phosphorus present in said phosphorus sulfide-hydrocarbon reaction product in the presence of from about 0.5 to about 2 mols of water per mol of said basic metal compound and from about 2 to about 20 mols of an alkyl alcohol per mol of said basic metal compound, which alcohol has from about 1 to about 3 carbon atoms in the alkyl group.

2. In the preparation of a metal-containing neutralized reaction product of a phosphorus sulfide and a hydrocarbon consisting essentially of said hydrocarbon, said metal, phosphorus and sulfur, in which the hydrocarbon is reacted with from about 1% to about 50% of a phosphorus sulfide at a temperature of from about 200° F. to about 600° F., and neutralized with a basic metal compound; the improvement comprising neutralizing the phosphorus sulfide-hydrocarbon reaction product with from about 3 to about 15 parts by weight of said basic metal compound per part by weight of phosphorus present in said phosphorus sulfide-hydrocarbon reaction product in the presence of from about 0.5 to about 2 mols of water per mol of said basic metal compound and from about 2 to about 20 mols of an alkyl alcohol per mol of said basic metal compound, which alcohol has from about 1 to about 3 carbon atoms in the alkyl group; at a temperature not higher than the reflux temperature of said mixture.

3. The method of neutralizing the reaction product of a phosphorus sulfide and a hydrocarbon which reaction product consists essentially of said hydrocarbon, phosphorus and sulfur, in which the hydrocarbon is reacted with from about 1% to about 50% of a phosphorus sulfide at a temperature from about 200° F. to about 600° F., with a basic metal compound, which method comprises diluting said phosphorus sulfide-hydrocarbon reaction product with a normally liquid hydrocarbon to a phosphorus content of from about 0.5 to about 5%, admixing from about 3 to about 15 parts by weight of a basic metal compound per part by weight of phosphorus present in said phosphorus sulfide-hydrocarbon reaction product, and a normally liquid hydrocarbon to form a slurry, adding from about 0.5 to about 2 mols of water per mol of said basic metal compound to at least one of said liquid hydrocarbon mixtures, adding from about 2 to about 20 mols of an alkyl alcohol, having from about 1 to about 3 carbon atoms in said alkyl group, to at least one of said liquid hydrocarbon mixtures, admixing the diluted phosphorus sulfide-hydrocarbon reaction product and the slurry of said basic metal compound, maintaining said mixture at a temperature not higher than reflux temperature for about 1 to about 5 hours whereby substantial neutralization of said phosphorus sulfide-hydrocarbon reaction product is effected, and then heating said neutralized mixture to about 400° F. to drive off said water and said alcohol.

4. The method of claim 3 wherein said basic metal compound is barium oxide.

5. The method of claim 3 wherein said phosphorus sulfide-hydrocarbon reaction product is the reaction product of $P_2S_5$ and a butylene polymer having a molecular weight of from about 500 to about 50,000.

6. The method of claim 3 wherein said alcohol is methanol.

7. The method of claim 3 wherein the neutralization is carried out at the reflux temperature of said mixture.

8. The method of claim 3 wherein said neutralization is carried out at a temperature below the reflux temperature of said mixture.

9. The method of claim 3 wherein said diluted phosphorus sulfide-hydrocarbon reaction product is contacted with an adsorbent clay at a temperature of from about 100° F. to about 500° F. before said neutralization step.

References Cited in the file of this patent

UNITED STATES PATENTS

| | | |
|---|---|---|
| 2,534,217 | Bartleson | Dec. 19, 1950 |
| 2,580,430 | Hughes et al. | Jan. 1, 1952 |
| 2,727,030 | Beretvas | Dec. 13, 1955 |